April 6, 1943.   F. H. RUSSELL   2,315,659
MACHINE FOR THE ASSEMBLING OF FRESHLY PREPARED FOOD
Filed Sept. 18, 1940   3 Sheets-Sheet 2
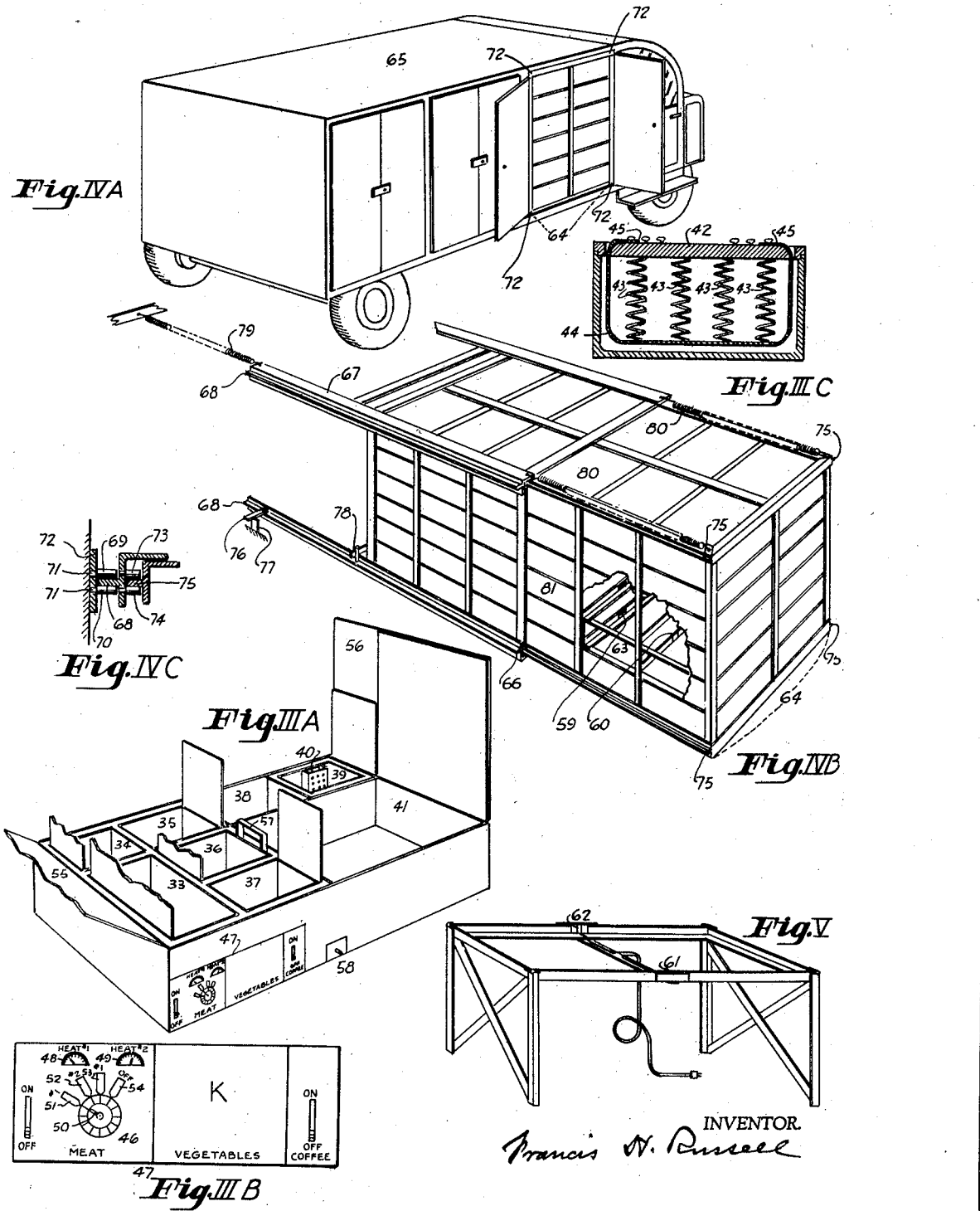

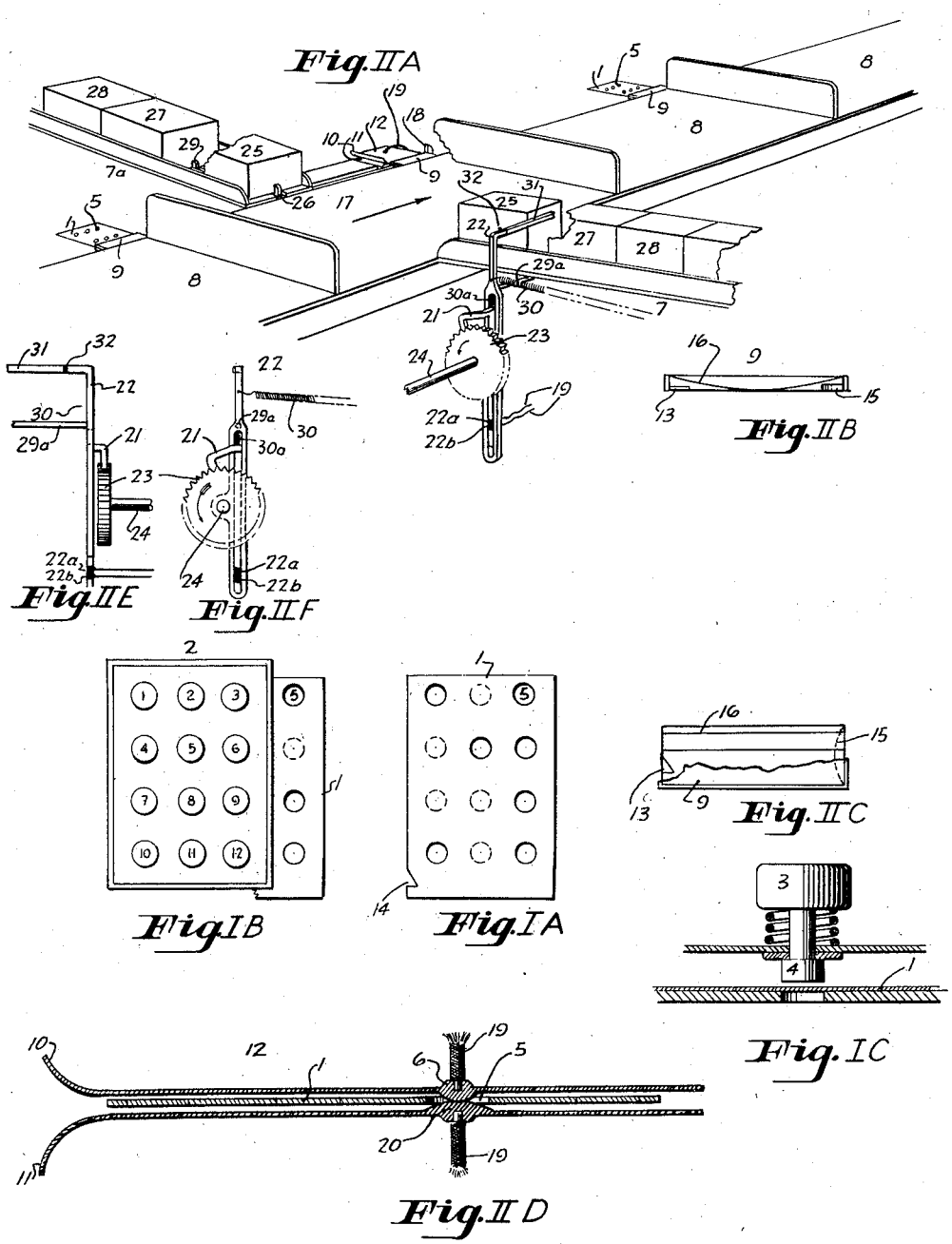

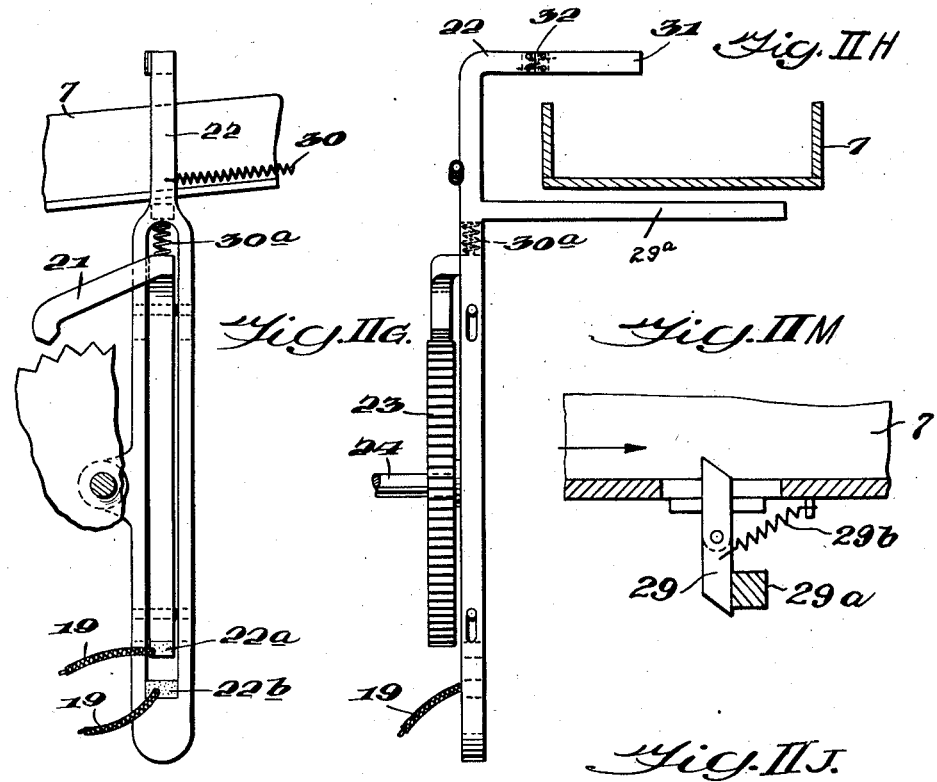
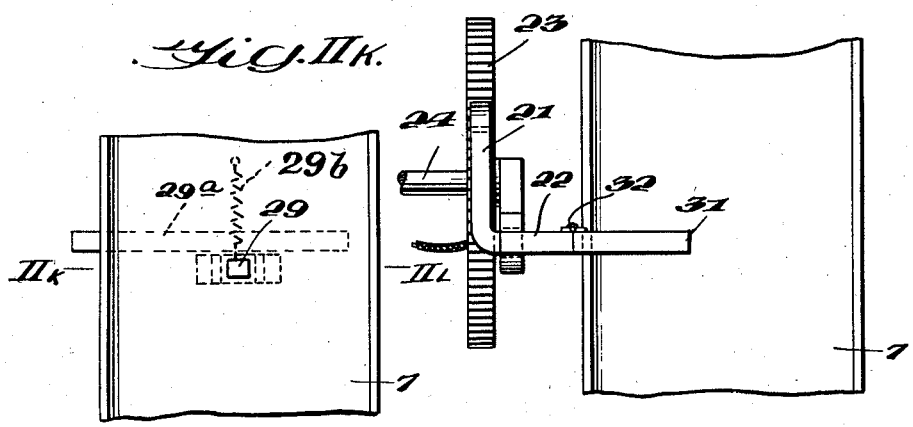
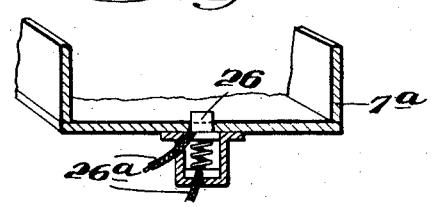

Patented Apr. 6, 1943

2,315,659

UNITED STATES PATENT OFFICE 2,315,659

MACHINE FOR THE ASSEMBLING OF FRESHLY PREPARED FOOD

Francis H. Russell, Arlington, Mass.

Application September 18, 1940, Serial No. 357,336

4 Claims. (Cl. 186—1)

The invention relates to dependent machines for the assembling of freshly prepared food (and of the accessories to be used in the serving of the food) at a central kitchen (where the food is prepared), and its transportation from the central kitchen to the home of the consumer, by which machines the prepared articles of food in separate dishes, the various articles of food being respectively ready for consumption, ready for cooking, or in the process of cooking, as well as the accessories for serving the food, are rapidly assembled at a central kitchen into individual consumers' orders by means of a compartmented conveyor belt with electrically operating order-control-cards used in conjunction with automatic delivery shelves, and are transported to the home of the consumer is individual food-containers having electric plugs conveying current to heating coils or plates in the container to which electric current is provided during transit in a truck through racks with automatic receptacles for said container plugs, and after delivery through a stationary rack providing plug receptacles.

The invention is illustrated in the accompanying drawings, in which Figure IA is the order-control-card; Figure IB is the punching unit; Figure IC is a punch key in the punching unit; Figure IIA is the compartmented assembling conveyor belt and delivery shelves; Figures IIB and IIC are the order-control-card holder attached to a compartment of the conveyor belt; Figure IID is the electric delivery-control contact unit; Figures IIE and IIF are the propelling arm of a delivery shelf; Figure IIG is a detail side view of the electro-magnets; Figure IIH is a detail front view showing the relation and connection of the electro-magnets to the shelving; Figure IIJ is a plan view of parts shown in Figure IIH; Figures IIK and IIL are fragmentary detail views; Fig. IIM is a fragmentary detailed view of the pawl or stop in the shelf on which the dishes slide; Figure IIIA is the food-container; Figure IIIB is the heat control unit of a food-container; Figure IIIC is the accessories case of the food-container; Figure IVA is the truck with food-container racks; Figure IVB is a single truck-rack; Figure IVC is a section of a truck-rack roller-support; Figure V is the stationary rack.

The order-control-card 1 is shaped for insertion in punching unit 2 in which any key, such as 3, having sharp end 4, by being pushed down, makes corresponding hole 5 in card 1 when fully inserted. The hole punched in card 1 by any given key corresponds to the position of the contact spring 6 in the electric delivery-control contact unit 12 of a given delivery shelf 7 along the conveyor belt 8 (7a being view of similar shelf from opposite side to show pawls 26 and 29 and electric delivery-control contact unit 12 corresponding to the same on shelf 7, shelves 7 and 7a thus being considered herein as different views of the same shelf). Any desired number of holes may be punched in card 1 to correspond with the desired shelves along conveyor belt 8 at which delivery of the respective articles of food is desired. The card 1 is insertable in and held firmly by card holder 9 attached to the under side of compartmented conveyor belt 8 so as to pass under delivery shelf 7 (or 7a) and between guides 10 and 11 of electric delivery-control contact unit 12. The card holder shown in detail in Figures IIB and IIC has point 13 projecting in from one side which fits into notch 14 cut in card 1 and has spring 15 to press card against opposite side of holder, and spring 16 on top side pressing card against bottom, thus holding card firmly in position but permitting easy removal by pressing card against spring 15. Conveyor belt 8 moves in direction indicated by arrow (from left to right). Order-control-card 1 passes between two guides 10 and 11 of electric delivery-control contact unit 12. At the moment that a given compartment 17 of the conveyor belt 8 is opposite a delivery shelf 7 (7a), the accompanying order-control-card 1 is in position between guides 10 and 11, and the card holder 9 permits switch 18 to establish momentary electrical current in wire 19. If card 1 has been punched for delivery at given shelf 7 (7a), hole 5 in card 1 is at position of electrical contact spring 6 at moment that switch 18 establishes electric current. Any desired form of switch may be used, which on contact of the card holder therewith will momentarily establish the circuit through wires 19—19 through contacts 20 and 6. The electrical contact is established through hole 5 between contact spring 6 and terminal point 20 of the other portion of wire 19, the switch being actuated by card holder 9 striking the switch in the movement of the card and card holder along the table. The establishing of electrical contact between two portions of wire 19 at 20 draws down pawl 21 on propelling arm 22, by action of electro-magnets 22a and 22b against ratchet wheel 23 revolving on axis 24, thus moving propelling arm 22 and causing arm 22 to propel dish (or utensil) 25 onto compartment 17 of conveyor belt 8. At the same moment that pawl 21 is engaged, holding pawl 26 is released by similar electro-magnetic action induced by current in wire 19, releasing dish (or utensil) 25 for propulsion by arm 22 onto conveyor belt 8; that is the same current that causes pawl 21 to engage the ratchet wheel also actuates the holding pawl 26, lowering same out of the way of the dish 25. Pawl 21 is automatically disengaged when arm 22 reaches edge of delivery shelf. The length of the electric current is so established through wires 26a as to release pawl 26 at this point. Motion of dishes 27, 28, etc. toward position in front of arm 22 is by gravity (from incline) or other pressure. Second dish 27 is held back during delivery of first dish 25 by pawl 29 until propelling arm 22 is disengaged and returns to original position by force of spring 30. Pawl 29 holds back the second dish 27 while the first dish 25 is being propelled or pushed on to the conveyor belt. When propelling arm 22 returns to its original or normal position, arm 29a trips pawl 29, allowing the dish 27 to move or slide into the position previously occupied by dish 25. As dish 27 passes, pawl 29 springs back, catching or stopping movement of dish 28. The pawl 29 is mounted in the shelf, and has a spring as at 29b which normally holds the pawl in position to obstruct the movement of the dish, and, when the arm 29a strikes the pawl it is momentarily swung out of the path of the next dish and when the dish has passed the pawl, the pawl swings back into position to obstruct the passage of the next dish. Pawl 21 is lifted from ratchet wheel by spring 30a when it is released by electro-magnets. The return of propelling arm 22 to original position mechanically disengages pawl 29 by trip 29a, permitting dish 27 to slide into position originally occupied by dish 25, being permitted to pass arm 22 by reason of end 31 of arm 22 being fastened to base of arm by a spring hinge 32. The spring hinge 32 tends to keep arm portion 31 in its normal position. When propelling arm 22 is returning to its main position after propelling dish 25 on to the conveyor belt, arm portion 31 is struck by dish 27 as the dish is sliding into the position previously occupied by dish 25. Arm portion 31 is forced into open position against the pressure of the spring hinge while dish 27 is passing and, after the dish passes, returns to its normal position due to the spring hinge, thus being in a position to propel dish 27 on to the conveyor belt. If order-control-card 1 has not been punched at point corresponding to position of electrical contact spring at given delivery shelf, no electric current passes through unpunched point in card 1 and no delivery is made.

It will be seen that an order control card 1 is attached to a holder 9 at one edge of the conveyor opposite each of the compartments 8, and that there is a delivery shelf 7 arranged opposite each of said compartments 3, one only being shown in the drawings. On the delivery shelves are arranged dishes or receptacles containing food, each of the receptacles on one shelf containing the same character of food and the receptacles or dishes on the next shelf a different kind of food and so on according to the number of shelves. There are a number of openings 5 in the control 1 corresponding to the number of different kinds of food on the various shelves.

The food-container, shown in Figure IIIA, has the following compartments: compartment 33 with insertable meat cooking utensil (either broiler, roaster, pressure cooker, or other cooking utensil); compartment 34 with insertable coffee percolator or tea pot; compartments 35, 36 and 37 with insertable vegetable cooking utensils; compartment 38 with insertable pastry tin; compartment 39 with container 40 for solidified carbon dioxide used as a refrigerant (for keeping ice cream, salad, or liquids cold); and compartment 41 with insertable accessories case (for cereals, sugar, butter, cream, cold foods, and dishes and other accessories for serving the food, and also for the return to the central kitchen of the used dishes and other accessories). Figure IIIC shows the accessories case, having top 42 with numerous springs 43 pressing down against, and covered by, an apron 44 of rubber or other waterproof material, which can be drawn up by ends 45, thus compressing springs 43 against top 42 for packing and unpacking case, the pressure of the springs 43, when ends 45 are released, being such as to prevent dishes and other articles in case from moving or rattling. There are separate electric heating coils or plates under compartments 33, 35, 36, and 37, any one or all of which may be connected with a separate electric clock control represented by 46 in panel 47 with similar control for vegetables where indicated by K by which the heat in any of said compartments can be turned on to any of two or more degrees of heat predetermined by regulators 48 and 49, or to each degree of heat successively, and turned off, at any indicated times, by contact established by clock hand 50 and regulating contact 51, for turning on current for heat #1, 48, contact 52, for turning on current for heat #2, 49, contact 53, for turning on heat #1 again (if desired), and contact 54, for turning current off. The clock control units and panel may be placed at any point on side of container that interferes least with needed space adjoining it inside. Compartment 34 has an insertable coffee percolator or tea pot of its exact dimensions and a separate electric heating coil or plate which may be turned "on" or "off" by switch on control panel.

Each of compartments 33, 34, 35, 36, 37, 38, 39, and 41 have separate hinged tops held upright by springs and held in a closed position by a snap. Tops 55 and 56 each cover one half of the top of the container. The handle 57 may be pressed down to allow the top of the container to be level. A single blade electric plug 58 and a similar one on the opposite side of the container, establish contact with receptacles 59 and 60 in the truck rack or with receptacles 61 and 62 in the stationary rack, the blades being round and insertable into receptacles 59 and 60 by sliding the container horizontally into rack section 63 and insertable into receptacles 61 and 62 by lowering container into the stationary rack from vertically above. The sides, bottom and cover of the portion of the container surrounding compartments 33, 34, 35, 36, and 37 are insulated, as is also compartment 39. The container itself is made of a light, durable plastic or metal.

The truck body represented by Figure IVA has several racks, one of which is illustrated by Figure IVB. Truck rack 64 is permitted to roll completely outside of the truck body 65 and to be supported in such position by roller support 66 at the bottom and by roller support 67 at the top, the length of the roller support frame being the same as that of the rack 64. The tongues 68 of each roller support slide between two parallel series of rollers 69 and 70 whose pins 71 fasten to the body of the truck at 72. Opposite the tongue of each roller support are two similar series of rollers 73 and 74, receiving a tongue 75 on the side of the rack 64. Check 76 on inside end of roller support 66 prevents the inside end of the roller support from going more than half way out of truck, being stopped by block 77. A similar check 78 stops inside end of rack at point half way between ends of roller support, thus just permitting all of rack to be out of truck. The check 78 on end of rack is hinged, permitting rack to be entirely removed from truck if desired. Roller support 67 on the top of the truck-rack is similar to roller support 66 on the bottom, having, in addition, the inside end of the roller support 67 attached by spring 79 (and corresponding spring on other side of roller support) to the closed (left) side of the truck and the other end of the roller support 67 attached by springs 80 to the outside end of the truck-rack, thus tending to lift the outside end of the truck-rack as well as supporting it. The truck-rack is held at any given position along the roller supports by a pawl and ratchet. Springs 80 can be detached from the outside end of the truck-rack when the truck-rack is removed.

Each truck-rack holds numerous food-containers as indicated. The truck body has a generator or storage battery for supplying electric current to each food-container through receptacles in each rack section represented by 59 and 60 with which plug 58 and the corresponding plug on the other side of the container slide into contact when in the position in the rack as represented by 81.

Figure V is a stationary rack for use in the consumer's home, electrical contact with the house circuit being established through receptacles 61 and 62 when food-container is placed on rack. The rack may be provided with wheels for easy moving of rack and food-container at home of consumer.

By this invention, food which is freshly prepared or in the process of cooking and which is in dishes or utensils which fit into the respective compartments of the container unit, and the appropriate accessories for serving the specific foods, may be placed on the delivery shelves and assembled as described above into individual consumers' orders in compartments on the conveyor belt. At the end of the conveyor belt food of a given compartment is placed in a container unit which is placed in a truck rack for delivery by the truck to a stationary rack at the consumer's home.

I am aware that prior to my invention the following, which are utilized in my invention, have been made, and I therefore do not claim them in the form now covered by patents or dedicated to the public: conveyor belt, automatic electrical control through punched card, single card punches, simple compartmented food containers, heating coils or plates, automatic clock control of heating coils or plates, pressure cookers, coffee percolators, solidified carbon dioxide used as a refrigerant, and roller supports for drawers; but I do claim:

1. In a machine for assembling articles of food into individual consumer's orders, a conveyor divided into compartments, a control card attached to the edge of the conveyor opposite each compartment, means adjacent the edge of the conveyor and with which each order control card is adapted to cooperate, a delivery shelf at the opposite side of said conveyor from that carrying the order control cards at each compartment, each shelf adapted to carry a plurality of receptacles containing food products, the various receptacles containing one character of food on one delivery shelf and the receptacles on each of the other delivery shelves containing a different character of food, a delivery control unit, means for forcing the receptacles from the shelf onto the conveyor, said control cards as they move past the delivery unit, cooperating therewith to actuate the last mentioned means and deliver a food container from the delivery shelf to the conveyor as the delivery card on the conveyor passes by the first above mentioned means whereby there will be placed in each compartment a complete order for any one customer.

2. In a machine for assembling articles of food into individual consumer's orders, a conveyor divided into compartments, a control card attached to the edge of the conveyor opposite each compartment, a delivery shelf at the opposite side of said conveyor from that carrying the order control cards at each compartment, each shelf adapted to carry a plurality of receptacles containing food products, the various receptacles containing one character of food on one delivery shelf and the receptacles on each of the other delivery shelves containing a different character of food, each control card provided with a series of openings corresponding to the number of compartments, means adjacent the edge of the conveyor, said means adapted to cooperate with the opening in the card whereby the food on the shelf called for by the particular opening in the card is delivered to a particular compartment.

3. In a machine for assembling articles of food into individual consumers' orders, a conveyor divided into compartments, a control card attached to the edge of the conveyor opposite each compartment, a delivery shelf at the opposite side of said conveyor from that carrying the order control cards at each compartment, each shelf adapted to carry a plurality of receptacles containing food products, the various receptacles containing one character of food on one delivery shelf and the receptacles on each of the other delivery shelves containing a different character of food, each control card provided with a series of openings corresponding to the number of compartments, means adjacent the edge of the conveyor, said means adapted to cooperate with the opening in the card whereby the food on the shelf called for by the particular opening in the card is delivered to a particular compartment, means for forcing the receptacles from the shelf onto the conveyor, a delivery control unit, said control cards as they move past the delivery unit cooperating therewith to actuate the last mentioned means and deliver a food container from the delivery shelf to the conveyor as the delivery card on the conveyor passes by the first above mentioned means, whereby there will be placed in each compartment a complete order for any one customer.

4. In a machine for assembling articles of food into individual consumer's orders, a conveyor divided into compartments, a control card attached to the edge of the conveyor opposite each compartment, an electrical contact unit adjacent the edge of the conveyor provided with spring pressed contact points, said control cards provided with a series of openings one for each compartment, said control card, in the movement of the conveyor passing between said contacts, the electrical circuit being established when the spring pressed contacts are opposite a particular opening in the card, a delivery shelf at the opposite side of said conveyor from that carrying the order control cards at each compartment, each shelf adapted to carry a plurality of receptacles containing food products, the various receptacles containing one character of food on one delivery shelf and the receptacles on each of the other delivery shelves containing a different character of food, electrically actuating means for forcing the receptacles from the shelf onto the conveyor, when the circuit is established due to the particular opening coming opposite said contacts and thereby delivering a food container from the delivery shelf to the conveyor, whereby there will be placed in each compartment a complete order for any one customer.

FRANCIS H. RUSSELL.